3,689,471
TERNARY CATALYST SYSTEMS FOR THE POLYMERIZATION OF CYCLE OLEFINS
William Allen Judy, Akron, Ohio, assignor to
The Goodyear Tire & Rubber Co.
No Drawing. Filed Aug. 26, 1968, Ser. No. 755,374
Int. Cl. C08f 1/28, 3/02, 15/04
U.S. Cl. 260—88.2 E                                    9 Claims

ABSTRACT OF THE DISCLOSURE

A method for the ring opening polymerization of unsaturated alicyclic compounds containing at least 4 and not more than 5 carbon atoms and one double bond in the cyclic ring and unsaturated alicyclic compounds containing at least 8 carbon atoms and at least one double bond in the cyclic ring is disclosed which comprises subjecting such unsaturated alicyclic compounds to a catalyst system comprising (A) a tungsten or molybdenum halide or oxyhalide, (B) at least one Lewis acid of the formula $MX_n$ where M is a metal represented by aluminum, zinc, gallium, tin and antimony; X is a halogen such as bromine, chlorine, iodine and fluorine and $n$ is an integer equal to the valence of M and (C) a reducing agent selected from the group consisting of metals, metal hydrides, alkyl secondary amines, alkyl tertiary amines, saturated alkyl alcohols, alkyl phosphines and hydrogen.

This invention relates to a process for polymerizing unsaturated alicyclic compounds and to the products resulting therefrom. In its broad aspect, the invention is directed to the preparation of polymers derived from unsaturated alicyclic compounds which contain at least one alicyclic ring structure containing at least two carbon atoms connected through a double bond.

The polymerization process of this invention may be used to prepare novel solid polymers. The properties and characteristics of these polymers can be "tailor made" to fit a wide variety of uses and fields of application. The properties of the polymers resulting from the polymerization process of this invention can be varied over a wide range depending on (1) the particular unsaturated alicyclic monomer chosen to be polymerized, (2) the particular polymerization catalyst employed and (3) the particular polymerization conditions employed. The products resulting from the polymerization of this invention can be employed to produce finished rubber articles such as pneumatic tires, molded goods and the like, or they may be materials which are useful to manufacture articles such as films and fibers. They may also be employed to form finished products by molding techniques.

This invention comprises polymerizing at least one unsaturated alicyclic compound selected from the group of (1) unsaturated alicyclic compounds containing at least four and not more than five carbon atoms in the cyclic ring and containing one carbon-to-carbon double bond in the cyclic ring, and (2) unsaturated alicyclic compounds containing at least eight carbon atoms in the cyclic ring and containing at least one carbon-to-carbon double bond in the cyclic ring, by subjecting said alicyclic compounds to polymerization conditions, in the presence of a catalyst system comprising (A) at least one transition metal salt selected from the group consisting of tungsten halides, tungsten oxyhalides, molybdenum halides and molybdenum oxyhalides, (B) at least one Lewis acid of the formula $MX_n$ where M is a metal selected from a group consisting of aluminum, zinc, gallium, tin and antimony; X is a halide selected from a group consisting of chloride, bromide, iodide and fluoride, and $n$ is an integer equal to the valence of M, and (C) at least one reducing agent selected from a group of metals consisting of lithium, sodium, potassium, cesium, rubidium, magnesium, calcium, aluminum, gallium, tin, zinc, and selenium; metal hydrides wherein the metal is selected from a group consisting of lithium, sodium, potassium, rubidium, cesium, calcium, aluminum, gallium and tin; alkyl secondary amines containing from 1 through 8 carbon atoms in the alkyl groups; alkyl tertiary amines containing from 1 through 8 carbon atoms in the alkyl groups; saturated alkyl alcohols containing from 1 through 10 carbon atoms in the alkyl groups; trialkyl phosphines containing from 1 through 8 carbon atoms in the alkyl groups; and molecular hydrogen.

Representative examples of tungsten and molybdenum halides useful as the first or (A) catalyst component of this invention include molybdenum dibromide, molybdenum tribromide, molybdenum tetrabromide, molybdenum trichloride, molybdenum tetrachloride, molybdenum pentachloride, molybdenum hexafluoride, tungsten dibromide, tungsten pentabromide, tungsten hexabromide, tungsten dichloride, tungsten tetrachloride, tungsten pentachloride, tungsten hexachloride, tungsten hexafluoride, tungsten diiodide and tungsten tetraiodide.

Representative examples of the tungsten and molybdenum oxyhalides useful as the first or (A) catalyst component of this invention include molybdenum oxytetrachloride, molybdenum oxytetrafluoride, tungsten oxytetrabromide, tungsten oxytetrachloride and tungsten oxytetrafluoride. The preferred metal halides and metal oxyhalides are those of tungsten. The most preferred are tungsten hexachloride, tungsten hexafluoride, tungsten oxytetrachloride and tungsten oxytetrafluoride.

Representative examples of the metal from which the Lewis acid, the second or (B) catalyst component of this invention, can be derived are aluminum, zinc, gallium, tin and antimony.

Representative examples of the Lewis acids useful in this invention include aluminum trihalide such as aluminum trichloride, aluminum tribromide and the like; zinc dihalides such as zinc dichloride, zinc dibromide and the like; gallium trihalides such as gallium tribromide and the like; tin tetrahalides such as tin tetrachloride, tin tetrabromide and the like; and antimony pentahalides such as antimony pentachloride, antimony pentabromide and the like.

Representative examples of the reducing agent, the third or (C) catalyst component of the invention include metals such as lithium, sodium, potassium, rubidium, cesium, magnesium, calcium, aluminum, gallium, tin, zinc and selenium; metal halides such as gallium hydride, lithium hydride, sodium hydride, potassium hydride, rubidium hydride, cesium hydride, calcium hydride, tin hydride; alkyl secondary amines and particularly those having from 1 through 8 carbon atoms in the alkyl groups representative of which are dimethyl amine, di-n-propyl amine, diisopropyl amine, dibutyl amine, diisobutyl amine, diamyl amine, diisoamyl amine, dioctyl amine and the like; alkyl tertiary amines having from 1 through 8 carbon atoms in the alkyl groups representative of which are trimethyl amine, triethyl amine, tributyl amine, triamyl amine, trioctyl amine, triisooctyl amine and the like; saturated alkyl alcohols containing from 1 through 10 carbon atoms in the aliphatic chain representative examples of which are methanol, ethanol, isopropanol, isoamyl alcohol, amyl alcohol, n-decyl alcohol and the like; trialkyl phosphines containing from 1 through 8 carbon atoms in the alkyl groups representative examples of which are trimethyl phosphine, triethyl phosphine, tributyl phosphine, trioctyl phosphine and the like; and molecular hydrogen.

The most preferred metals are aluminum, zinc and antimony. The most preferred metal hydrides are lithium hydride, sodium hydride and potassium hydride. The most preferred amines are tertiary amines such as triethyl amine and the most preferred alcohol is ethanol.

Since various factors or considerations will influence the optimum range of the three catalyst components in relation to each other, the molar ratios of the three components which optimize the polymerization conditions, cannot be readily set forth. However, by following the various teachings found elsewhere and particularly in the examples of this application, those skilled in the art can readily determine the optimum molar range of the three catalyst components to each other.

It has been found, however, that good results are obtained in the practice of this invention when the molar relationship between the three catalyst components (A), (B) and (C), as previously defined, are within a molar ratio of $C/A$ ranging from about 10/1 to about 15/1 and the molar ratio of $B/A$ ranges from about 5/1 to about 0.6/1.

The catalysts employed in this invention are prepared by mixing the components by known techniques. Thus, the catalyst may be prepared by "preformed" or "in situ" techniques. By "preformed" is meant that the catalyst components are mixed together prior to exposure of any of the catalyst components to the monomer to be polymerized. By "in situ" is meant that the catalyst components are added separately to the monomer to be polymerized. The catalyst components may be mixed either as pure compounds or as suspensions or solutions in liquid which do not adversely affect the polymerization.

While the presence of the monomer is not essential during the formation of the active catalyst by a mixing of components (A), (B) and (C) and this fact facilitates the use of "preformed" catalysts, it has been found that aging does not detrimentally affect the catalyst but, in fact, it has been found that aging the catalyst is advantageous in that polymer yields increase with an increase in the aging time.

Various unsaturated alicyclic compounds may be employed in the practice of this invention. As is mentioned before, unsaturated alicyclic compounds containing at least 4 and not more than 5 carbon atoms in the cyclic ring which contain one carbon-to-carbon double bond in the cyclic ring and unsaturated alicyclic compounds containing at least 8 carbon atoms in the cyclic ring which contain at least one carbon-to-carbon double bond in the cyclic ring are operable in this invention.

The preferred unsaturated alicyclic compounds of this invention are those comprising a single unsaturated alicyclic ring. These alicyclic rings may be mono- or multisubstituted by such groups as alkyl, aryl, arylalkyl and halogen groups.

Representative examples of unsaturated alicyclic compounds containing a single alicyclic ring having at least 4 and not more than 5 carbon atoms in the cyclic ring and containing one double bond in said ring are cyclobutene and cyclopentene. Representative examples of compounds having at least 8 carbon atoms in the cyclic ring and having from one to two double bonds in said ring are cyclooctene; 1,4- and 1,5-cyclooctadiene. Representative of compounds having nine carbon atoms and one to three double bonds in the ring are cyclononene, 1,4- and 1,5-cyclononadiene and 1,4,7-cyclononatriene. Representative of compounds having ten carbon atoms and one to three double bonds in the ring are cyclodecene, 1,4-, 1,5- and 1,6-cyclodecadiene and 1,4,6- and 1,4,7-cyclodecatriene. Representative of compounds having eleven carbon atoms and one to three double bonds in the ring are cycloundecene, 1,4-, 1,5- and 1,6-cycloundecadienes and 1,4,7- and 1,4,8-cycloundecatriene. Representative of compounds having twelve carbon atoms and one to three double bonds in the ring are cyclododecene, 1,4-, 1,5-, 1,6- and 1,7-cyclododecadiene, and 1,4,7-, 1,4,8-, 1,4,9- and 1,5,9-cyclododecatriene.

The most preferred unsaturated alicyclic compounds of this invention are those containing from 1 to 3 carbon-to-carbon double bonds in the ring and in which the double bonds are located in relation to each other in a manner that they are not adjacent and are non-conjugated. Representative examples of such preferred materials are cyclobutene, cyclopentene, cyclooctene, cyclododecene, 1,5-cyclooctadiene and 1,5,9-cyclododecatriene.

Still another class of preferred unsaturated alicyclic monomers are those containing one carbon-to-carbon double bond in the ring of at least 4 and not more than 5 carbon atoms, examples of which are cyclobutene and cyclopentene. Another group which is preferred are those which have at least 8 carbon atoms in the ring and not more than 12 carbon atoms in the ring and contain 1, 2 or 3 carbon-to-carbon double bonds in said ring, examples of which are previously set forth.

Representative examples of substituted unsaturated alicyclic compounds are alkyl-substituted compounds such as 1,5,9-trimethyl cyclododecatriene; aryl-substituted compounds such as 3-phenylcyclooctene-1; aralkyl-substituted compounds such as 3-benzylcyclooctene-1; alkaryl-substituted compounds such as 3-methylphenylcyclooctene-1; halogen-substituted compounds wherein the halogens are iodine, chlorine, bromine and fluorine such as 5-chlorocyclooctene-1, 3-bromocyclooctene-1, 5-chlorocyclododecene-1, and 5,6-dichlorocyclooctene-1. Mixtures of the unsaturated alicyclic compounds may be polymerized including both substituted unsaturated alicyclic compounds and the unsubstituted unsaturated alicyclic compounds.

The polymerizations of this invention may be conducted in solution or in bulk. When the polymerization is carried out in solution, solvents which do not adversely affect the polymerization are desired. Representative of useful solvents are liquid aromatic hydrocarbons such as benzene and toluene; hydrogenated aromatic hydrocarbons such as tetralin; liquid aliphatic hydrocarbons such as pentane, heptane, hexane, petroleum ether, decane; and alicyclic hydrocarbons such as cyclohexane, decalin and cyclooctane. Mixtures of such solvents may also be used.

Temperatures at which the polymerization reaction is carried out can be varied over a wide range. Usually the temperature can be varied from extremely low temperatures such as $-60°$ C. up to high temperatures such as $150°$ C. or higher. Thus, the temperature is not a critical factor of the invention. It is generally preferred, however, to conduct the reaction at a temperature in the range of from about $-20°$ C. to about $80°$ C. The pressure at which the polymerization is carried out can also be varied over a wide range. The reaction can be conducted at atmospheric pressure, or, if desired, it can be carried out at subatmospheric pressure or superatmospheric pressure. Generally, a satisfactory polymerization is obtained when the reaction is carried out at about autogenous pressure developed by the reactants under the operating conditions used.

The polymerization time will vary and can range from a few seconds to 24 hours or more, depending upon the polymerization conditions and the degree and extent of polymerization desired.

The polymerization reaction may be carried out as a batch or as a continuous process. In preforming the polymerizations of this invention, the introduction of the monomer, catalyst and solvent, when a solvent is employed, can each be made to the reaction zone alternately, intermittently and/or continuously.

The amount of catalyst employed in the polymerizations of this invention may be varied over a range of concentrations. Of course, a catalytic amount of catalyst must be employed. The optimum amount of catalyst depends on a number of factors such as temperature, reactants used, purity of reactants, reaction times desired and the like. Those skilled in the art will be readily able to determine the optimum catalytic ranges. Polymerizations can be conducted wherein the quantity of tungsten or molybdenum employed is about $2.0 \times 0^{-4}$ mole with compoments (B) and (C) adjusted to yield a desirable atomic-ratio of A/B/C.

It is thought that the polymerizations of this invention take place through a ring opening polymerization mechaism. Such ring opening polymerizations of unsaturated alicyclic compounds can be used to make a number of alternating copolymers and terpolymers that have not been capable of being made before. For example, the ring opening polymerization of cyclooctene yields a polyoctenamer which may be considered the alternating copolymer of one butadiene unit and two ethylene units.

The ring opening polymerization of cyclooctadiene-1,5 leads to a polybutenamer which is equivalent to the 1,4 addition polymer of butadiene-1,3. In practicing this invention, polybutenamers can be formed whose structure comprises alternating cis- and transvinylene groups in successive polymeric repeat units which is equivalent to the polymer which may be obtained by the 1,4-addition polymerization of butadiene-1,3 in which successive butadiene-1,3 units alternately occur in cis- and transconfigurations. Such a polymer could be considered an alternating copolymer of cis- and trans-1,4 poly(butadiene-1.3).

The ring opening polymerization of 5-methylcyclooctene 1 would yield the alternating terpolymer of butadiene-1,3, propylene and ethylene; likewise, 5-phenylcyclooctene-1 would yield the alternating terpolymer of butadiene-1,3, styrene and ethylene. The ring-opening polymerization of 5-methylcyclooctadiene-1,5 would yield the alternating copolymer of butadiene-1,3 and isoprene. The ring-opening polymerization of substituted cyclododecenes can yield even more complicated alternating copolymers, terpolymers and even quadripolymers.

Ring opening polymerization also allows one to make copolymers and terpolymers that have not heretofore been made by ordinary addition polymerizations. A representative example of such a polymerization is the ring opening polymerization of cyclononene which yields the perfectly alternating copolymer of butadiene-1,3 and pentamethylene.

Ring opening polymerization of halogen-substituted unsaturated alicyclic monomers also leads to interesting copolymers and terpolymers; for instance, 5-chlorocyclooctene-1 would lead to a polymer equivalent to an alternating interpolymer of butadiene-1,3 plus vinyl chloride and ethylene; 3-bromocyclooctene-1 would yield a polymer equivalent to an alternating interpolymer of ethylene plus 1-bromobutadiene-1,3 and ethylene and 5-chlorocyclododecene-1 would lead to a polymer equivalent to an alternating interpolymer of butadiene-1,3 plus vinyl chloride and 3 ethylene molecules.

Ring opening polymerization of unsaturated alicyclic hydrocarbons containing at least 4 and not more than 5 carbon atoms and containing one carbon-to-carbon double bond in the cyclic ring and those containing 8 carbon atoms and at least one carbon-to-carbon double bond in the cyclic ring produces high molecular weight polymers which have a high degree of resistance to oxidation.

Bulk polymerizations may be desirable from a process standpoint as relatively little heat appears to be evolved per mole of unsaturated alicyclic monomer polymerized in practicing this invention. This constitutes a great advantage for this ring opening type of polymerization over conventional addition polymerization.

The low volume decrease accompanying a ring opening polymerization is another major advantage over conventional addition polymerization, particularly where these monomers are bulk polymerized to form potting compounds and various articles examples of which are molded plastic materials, molded rubber-like goods, shoe soles and heels, industrial belts and vehicle tires.

In these applications the monomer may be polymerized in the presence of one or more reinforcing carbon blacks, pigments or resins and certain antioxidants. The products made by this procedure may be crosslinked by adding polymerizable polyfunctional compounds, for example, bicyclopentadiene, to the main monomer. The molded products made by ring opening polymerization may be crosslinked by exposure to ionizing radiation such as gamma rays, X-rays or electrons. These molded products may also be crosslinked or vulcanized by incorporating certain compounds which, on heating during or subsequent to the polymerization, will lead to conventional crosslinking or vulcanization of these polymers.

The polymerization reaction may be terminated by incorporating various compounds which, upon heating, release materials which deactivate the catalyst. Representative examples of such compounds are the ammonia salts such as ammonium chloride, ammonium carbonate, ammonium acetate, ammonium oleate, ammonium sulphate, and ammonium phosphate; other ammonia-releasing compounds such as tetraalkyl ammonium halides, e.g., tetramethyl ammonium chloride; water-releasing agents such as salts with water of crystallization, examples of which are: $Al_2(SO_4) \cdot 17H_2O$; $NH_4Al(SO_4)_2 \cdot 12H_2O$;

$FeSO_4 \cdot 7H_2O$; $MgHPO_4 \cdot 7H_2O$; $KAl(SO_4)_2 \cdot 12H_2O$
$KNaCO_3 \cdot 6H_2O$; $Na_2B_4O_7 \cdot 10H_2O$; $Na_2CO_3 \cdot 10H_2O$
$NaHPO_4 \cdot 12H_2O$; $Na_2SO_4 \cdot 10H_2O$ and $ZnNO_3 \cdot 6H_2O$.

The following examples are set forth to further illustrate the nature of this invention. However, it should be understood that the examples are set forth for illustrative and not for limitative purposes. The parts and percentages are by weight unless otherwise indicated. All experiments were conducted in an atmosphere of nitrogen unless noted.

EXAMPLE 1

A series of polymerizations was run in 4-ounce bottles containing 17.0 grams (gms.) of freshly distilled cyclooctene and 80 milliliters (ml) of dried pentane. All manipulations of charging monomer, solvent and catalyst were carried out in a nitrogen atmosphere. A 0.05 molar (M) dispersion of tungsten hexachloride ($WCl_6$) and aluminum (Al) powder was prepared in dried pentane. The aluminum to tungsten hexachloride ratio was 15/1. A 0.3 molar (M) slurry of aluminum chloride ($AlCl_3$) was prepared in dried benzene. Polymerizations were run for from 2 to 4 hours at 25° C. All polymerizations were terminated employing 5 ml. of a 10 percent by weight solution of tertiary butyl-p-cresol in benzene. Each run was polymerized employing $2.0 \times 10^{-4}$ moles of tungsten hexachloride and 3.0 millimoles of aluminum powder. All pertinent data are listed in the table below. Column 1 sets forth the experiment number, column 2 gives the preforming time of the catalyst ($WCl_6$/Al), column 3 the moles of aluminum chloride employed, column 4 the length of time for polymerization and column 5 the weight percent yield of polymer.

| 1 | 2 | 3 | 4 | 5 |
|---|---|---|---|---|
| Exp. No. | Catalyst preforming time, min. | $AlCl_3$ moles$\times 10^4$ | Polymerization time, hrs. | Yield, percent |
| 1 | 1.5 | 0 | 24 | 0 |
| 2 | 6.0 | 0 | 24 | 0 |
| 3 | 1.5 | 6 | 24 | 38.1 |
| 4 | 6.0 | 6 | 1.5 | 74.5 |
| 5 | 33.0 | 0 | 24 | 0 |
| 6 | 33.0 | 6 | 8 | 67.2 |
| 7 | 90.0 | 0 | 24 | 0 |
| 8 | 90.0 | 6 | 8 | 53.8 |
| 9 | 160.0 | 0 | 24 | 0 |
| 10 | 160.0 | 6 | 24 | 37.9 |
| 11 | 200.0 | 0 | 24 | 0 |
| 12 | 200.0 | 6 | 24 | 36.9 |
| 13 | 210.0 | 0 | 24 | 0 |
| 14 | 210.0 | 6 | 8 | 76.2 |

This example illustrates that in order to have polymerization take place in accordance with this invention the Lewis acid must be present.

EXAMPLE 2

A series of polymerizations were run similar to that in Example 1 except that a 0.05 M dispersion of tungsten hexachloride and aluminum powder was prepared in pentane to give an aluminum to tungsten (Al/W) ratio of 10/1. Each run was polymerized employing $2 \times 10^{-4}$ moles of tungsten hexachloride and 2.0 millimoles of aluminum. All pertinent data are listed in the table below. Column 1 sets forth the experiment number, column 2 gives the preforming time of the catalyst ($WCl_6/Al$), column 3 the number of moles of aluminum chloride used, column 4 the length of time for polymerization and column 5 the weight percent yield of polymer.

| 1 | 2 | 3 | 4 | 5 |
|---|---|---|---|---|
| Exp. No. | Catalyst preforming time, min. | $AlCl_3$ moles×10[4] | Polymerization time, hrs. | Yield, percent |
| 1 | 11 | 6 | 24 | 4.2 |
| 2 | 25 | 6 | 24 | 5.7 |
| 3 | 90 | 6 | [1]50 | 97.7 |
| 4 | 140 | 6 | [1]25 | 77.8 |
| 5 | 180 | 6 | [1]30 | 97.3 |
| 6 | 210 | 6 | 30 | 95.6 |
| 7 | 210 | 6 | 6 | 94.5 |

[1] Minutes.

While certain representative embodiments and details have been shown for the purpose of illustrating the invention, it will be apparent to those skilled in the art that various changes and modifications may be made therein without departing from the spirit or scope of the invention.

What is claimed is:

1. A polymerization process comprising polymerizing at least one unsaturated alicyclic compound selected from the group of (1) unsaturated alicyclic compounds containing at least four and not more than five carbon atoms in the cyclic ring and containing one carbon-to-carbon double bond in the cyclic ring and (2) unsaturated alicyclic compounds containing from eight to twelve carbon atoms inclusive in the cyclic ring and containing at least one carbon-to-carbon double bond in the cyclic ring by subjecting said unsaturated alicyclic compounds to polymerization conditions in the presence of a catalyst system comprising (A) at least one transition metal salt selected from a group consisting of tungsten halides, tungsten oxyhalides, molybdenum halides and molybdenum oxyhalides, (B) at least one Lewis acid of the formula $MX_n$ where M is a metal selected from the group consisting of aluminum, zinc, gallium, tin and antimony; X is a halogen selected from the group consisting of bromine, chlorine, iodine and fluorine and $n$ is an integer equal to the valence of the metal M and (C) at least one reducing agent selected from the group consisting of molecular hydrogen and the metal lithium, sodium, potassium, cesium, rubidium, magnesium, calcium, aluminum, gallium, tin, zinc and selenium and wherein the molar relationship between the three catalyst components defined by A, B and C are within a molar ratio of $C/A$ ranging from about 10/1 to about 15/1 and a molar ratio of $B/A$ ranging from about 0.6/1 to about 5/1.

2. A process according to claim 1 in which the (A) catalyst component is selected from the group consisting of tungsten hexachloride, tungsten hexafluoride, molybdenum pentachloride and molybdenum hexafluoride, the (B) catalyst component is aluminum trihalide and the (C) catalyst component is a metal selected from the group consisting of aluminum, zinc and antimony.

3. A process according to claim 1 in which the unsaturated alicyclic compound contains from 4 to 5 carbon atoms and only one carbon-to-carbon double bond in the cyclic ring.

4. A process according to claim 1 in which the unsaturated alicyclic compound contains 8 and not more than 12 carbon atoms in the cyclic ring and contains from 1 to 3 carbon-to-carbon double bonds in the cyclic ring which are located in a relation to each other that they are not conjugated.

5. A process according to claim 1 in which a mixture of cyclooctene and 1,5-cyclooctadiene are copolymerized.

6. A process according to claim 1 in which cyclooctadiene is homopolymerized.

7. A process according to claim 1 in which cyclododecatriene is homopolymerized.

8. A process according to claim 1 in which cyclooctadiene and cyclododecatriene are copolymerized.

9. A process according to claim 1 in which cyclooctene is homopolymerized.

References Cited

UNITED STATES PATENTS

| 3,074,918 | 1/1963 | Eleuterio | 260—93.1 |
| 3,476,728 | 11/1969 | Natta et al. | 260—93.1 |
| 3,449,310 | 6/1969 | Dall' Asta et al. | 260—93.1 |
| 3,458,489 | 7/1969 | Natta et al. | 260—93.1 |
| 3,459,725 | 8/1969 | Natta et al. | 260—93.1 |
| 3,462,403 | 8/1969 | Pendleton et al. | 260—93.7 |
| 3,639,371 | 2/1972 | Marshall | 260—93.1 |

OTHER REFERENCES

Gaylord and Mark: "Linear and Stereoregular Polymers," Interscience Publishers, New York, N.Y. (1959), pp. 93–97 relied on.

JOSEPH L. SCHOFER, Primary Examiner

R. A. GAITHER, Assistant Examiner

U.S. Cl. X.R.

260—80.6, 80.7, 82.1, 85.3, 93.1, 94.3